(12) United States Patent
Schüle et al.

(10) Patent No.: US 6,318,454 B1
(45) Date of Patent: Nov. 20, 2001

(54) COOLING MODULE

(75) Inventors: Matthias Schüle, Bietigheim-Bissingen; Artur Wäsch, Grossbottwar, both of (DE)

(73) Assignee: Behr GmbH & Co., Stuttgart (DE)

(*) Notice: Subject to any disclaimer, the term of this patent is extended or adjusted under 35 U.S.C. 154(b) by 0 days.

(21) Appl. No.: 09/520,005

(22) Filed: Mar. 6, 2000

(30) Foreign Application Priority Data

Mar. 5, 1999 (DE) .............................. 199 09 672

(51) Int. Cl.$^7$ ...................................... F28F 9/007
(52) U.S. Cl. ............................ 165/140; 165/67; 180/68.4
(58) Field of Search ............................. 180/68.4; 165/67, 165/140

(56) References Cited

U.S. PATENT DOCUMENTS

| | | | |
|---|---|---|---|
| 3,340,948 | * | 9/1967 | Deckert et al. ............ 180/68.4 |
| 5,046,554 | * | 9/1991 | Iwasaki et al. ............ 165/140 |
| 5,163,505 | * | 11/1992 | Hoffman et al. .......... 165/67 |
| 5,314,079 | * | 5/1994 | Hedeen .................... 165/140 |
| 5,657,817 | * | 8/1997 | Heine et al. .............. 165/67 |
| 5,996,684 | * | 12/1999 | Clifton et al. ............ 165/67 |
| 6,059,019 | * | 5/2000 | Brost et al. .............. 165/67 |

FOREIGN PATENT DOCUMENTS

| | | |
|---|---|---|
| 33 41 390 A1 | 5/1984 | (DE) . |
| 41 06 297 C2 | 9/1992 | (DE) . |
| 42 44 039 C2 | 7/1994 | (DE) . |
| 44 25 350 A1 | 1/1996 | (DE) . |
| 297 12 351 U1 | 10/1997 | (DE) . |

* cited by examiner

*Primary Examiner*—Allen Flanigan
(74) *Attorney, Agent, or Firm*—Crowell & Moring, LLP

(57) ABSTRACT

Typical cooling modules for motor vehicle engines consist of a coolant radiator and a charge air cooler arranged in parallel. The coolant radiator and the charge air cooler are fixedly coupled to one another by a hinge-type connection of their feed cases. The present invention assigns a connection piece to the feed case of one of the coolers, which connects the fin/tube block on one side. The connection piece projects toward the other cooler and form-lockingly engages in a fastening opening on the feed case of the adjacent cooler. This connection piece is provided approximately in the center between two additional outer fastening points, so that a stable block is formed by the two feed cases. This is sufficient to uniformly distribute asymmetrically introduced forces to both coolers and thereby avoid overloading on one cooler.

12 Claims, 3 Drawing Sheets

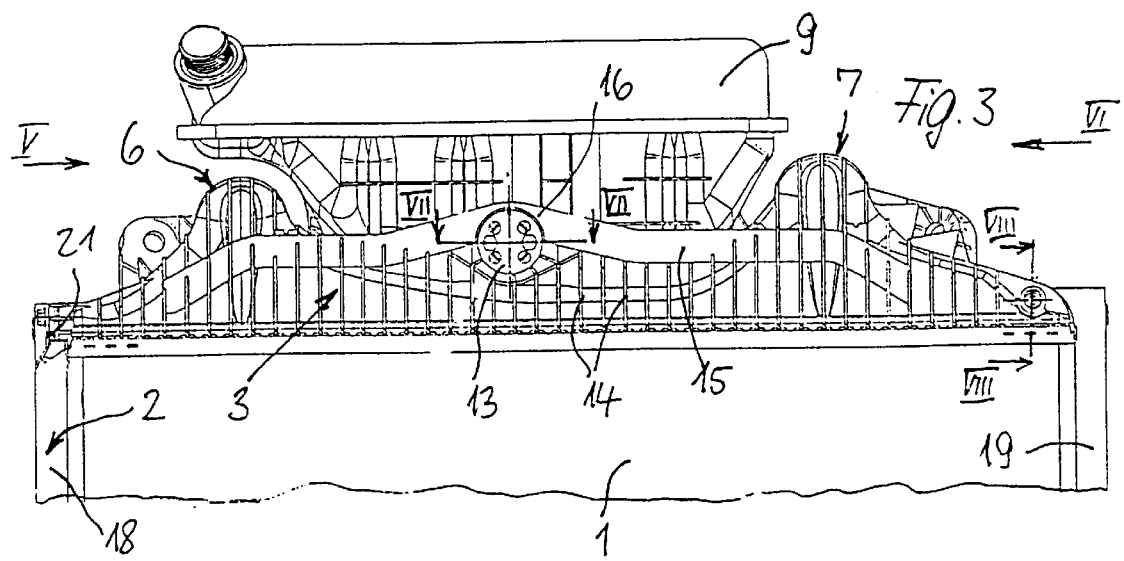
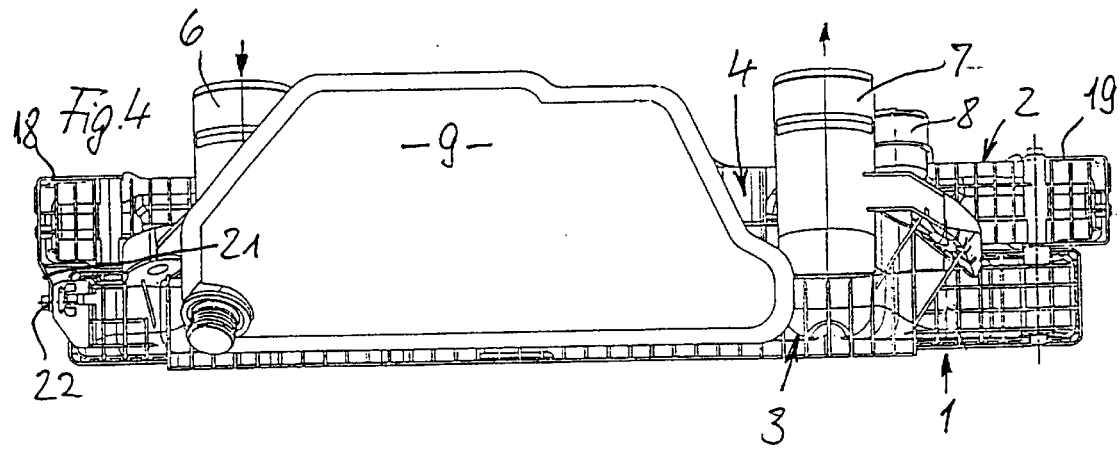
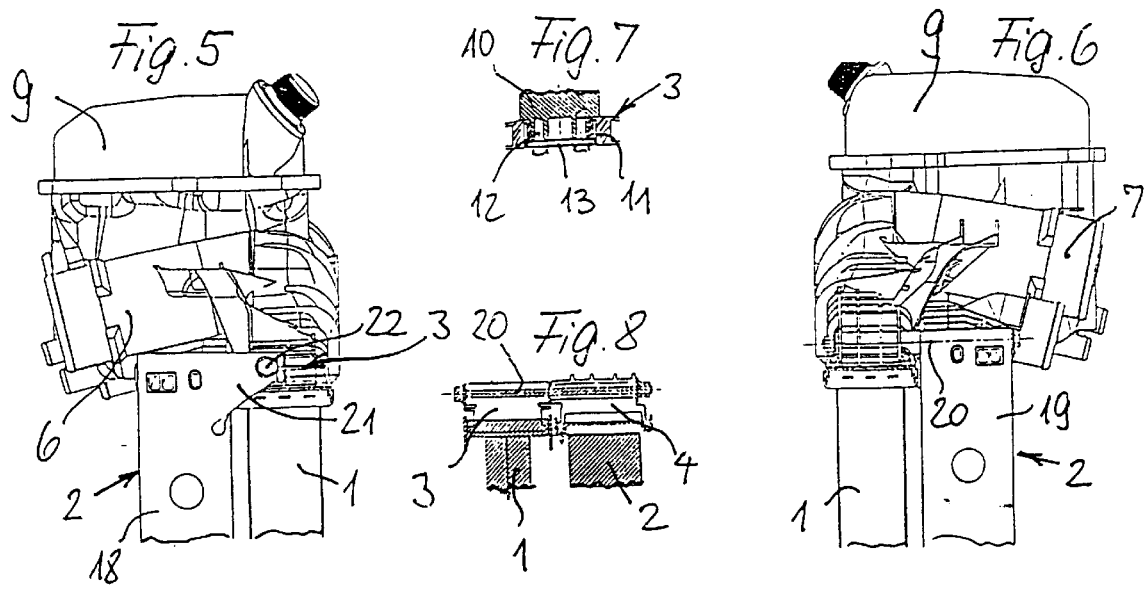

COOLING MODULE

This application claims the priority of German application 199 09 672.4, filed Mar. 5, 1999, the disclosure of which is expressly incorporated by reference herein.

BACKGROUND AND SUMMARY OF THE INVENTION

The present invention relates to a cooling module having two heat exchangers, through which air flows, which are connected directly behind one another in the flow direction of the air. The heat exchangers are connected with one another at outer ends of at least one pair of their feed cases for the medium to be cooled by air, particularly the coolant radiator and the charge air cooler.

An arrangement is known from German Patent Document DE 44 25 350 A1 for connecting two or more heat exchangers to form a cooling module of the initially mentioned type. In this arrangement, plug-type pins are assigned to one of the feed cases of the heat exchangers, which normally consist of fin/tube blocks with feed cases arranged at the open ends of the tubes. The plug-type pins project transversely from the feed case and engage in corresponding brackets at the feed case of the adjacent heat exchanger. In this manner, a hinge-type folding of one of the heat exchangers onto the other is to be achieved, with the attached position being maintained by detent elements provided at the ends of the feed cases of the heat exchangers facing away from the pins.

Because of the required swivelling operation of the heat exchangers with respect to one another, such a cooling module can be mounted or demounted only if sufficient space is available. As a rule, this space is not available after the installation into a motor vehicle. In addition, if one of the two heat exchangers is provided with an additional part fitted onto the feed case, such as an expansion tank, during operation of the motor vehicle, asymmetrical acceleration and deceleration forces are exercised on the feed case. Because of the resulting bending forces, these asymmetrical acceleration and deceleration forces may cause the connection between the feed case and the tube bottom and/or the fin/tube block to be impaired or become untight. Also, in a charge air cooler, the hot and pressurized air is asymmetrically introduced into the feed case. Because of the resulting forces which act upon the feed case, deformations can also be caused. In the long run, these deformations may lead to damage to the heal, exchanger or may make it necessary to correspondingly reinforce the feed cases and, as a result, make them undesirably heavy.

It is an object of the present invention to further develop a cooling module of the initially mentioned type such that it is less susceptible to asymmetrically introduced forces.

For achieving this object, a cooling module of the initially mentioned type is provided with at least one additional fastening point between the outer ends of the feed cases. Thus, the two feed cases are connected with one another in a stable manner so that they form a unit for the absorption of forces which otherwise act only upon one of the feed cases. As a result, without taking any significant additional measures to reinforce the individual feed cases, a decisive stiffening of the then formed block of two feed cases will occur. The block is made much more stable, and the connections to the fin/tube blocks are relieved by a uniform distribution of forces to both connections.

As a further development of the invention, for a cooling module with an additional part fitted onto one of the feed cases, particularly with an expansion tank fitted onto the feed case of the coolant radiator, the feed case of the coolant radiator may be equipped with a connection piece projecting to the adjacent feed case of a charge air cooler. The connection piece, for forming another fastening point, engages form-lockingly into an opening in the feed case of the charge air cooler. As a result of this further development, the acceleration and deceleration forces occurring, during operation, on a fitted-on expansion tank can be absorbed in a simple manner by both feed cases and thus by both heat exchangers.

As yet a further development of the invention, in such an embodiment, the expansion tank and the connection piece may be shaped in one piece to the feed case of the coolant radiator, and the connection piece can be provided with a relatively large cross-section and with threaded openings on the face side. Fastening screws, which are held on the feed case of the charge air cooler, are engaged in these threaded openings. As a result of this further development, mounting or demounting of the two heat exchangers is permitted by a parallel mutual displacement for which no more space than a space which corresponds approximately to the length of the fastening connection piece is necessary. Therefore, as a rule, a cooling module of this type can also be demounted in the installed condition in the motor vehicle, if this should be required.

As yet a further development of the invention, the opening in the feed case of the charge air cooler can be arranged in a bracket-type reinforcement and may be provided with a stop edge for a disk through which the fastening screws are guided. This embodiment results in a stable but relatively easily producible fastening of the feed cases on one another.

In a still further development of the invention, mutual fastening of the feed cases on their ends can take place by a stud which form-lockingly penetrates the two feed cases at a first end of the feed cases, by a connection piece which is provided in the center area and form-lockingly engages in the opening of the adjacent feed case, and, at the other end of the feed cases, by way of a bracket projecting from a side part. This bracket is expediently mounted on the side part of the coolant radiator and is fastened to the feed case of the charge air cooler by way of a screw extending with its axis perpendicular to the axes of the connection piece and the stud. As a result of this further development, fastening of the feed cases of the coolant radiator and of the charge air cooler takes place by two fixed bearings and one movable bearing formed by the bracket, which maybe arranged on the side of the feed case for the charge air cooler assigned to the air inlet connection piece of the charge air cooler. As a result of this further development, a certain linear expansion of the feed case of the charge air cooler is not hindered on the side acted upon by the hot charge air, so that damage from linear expansions is prevented.

The invention is illustrated in the drawing figures and will be described in the following.

BRIEF DESCRIPTION OF THE DRAWINGS

FIG. 3 is a view of the cooling module of FIG. 2 from the side of the charge air cooler;

FIG. 4 is a top view of the cooling module according to FIG. 1;

FIG. 5 is a front-side view of the cooling module of FIG. 1 in the direction of the arrow V of FIG. 3;

FIG. 6 is a front-side view of the cooling module of FIG. 1 in the direction of the arrow VI of FIG. 3;

FIG. 7 is a sectional view along line VII—VII of FIG. 3; and

FIG. 8 is a sectional view along line VIII—VIII in FIG. 3.

DETAILED DESCRIPTION OF THE DRAWINGS

Figure 1:
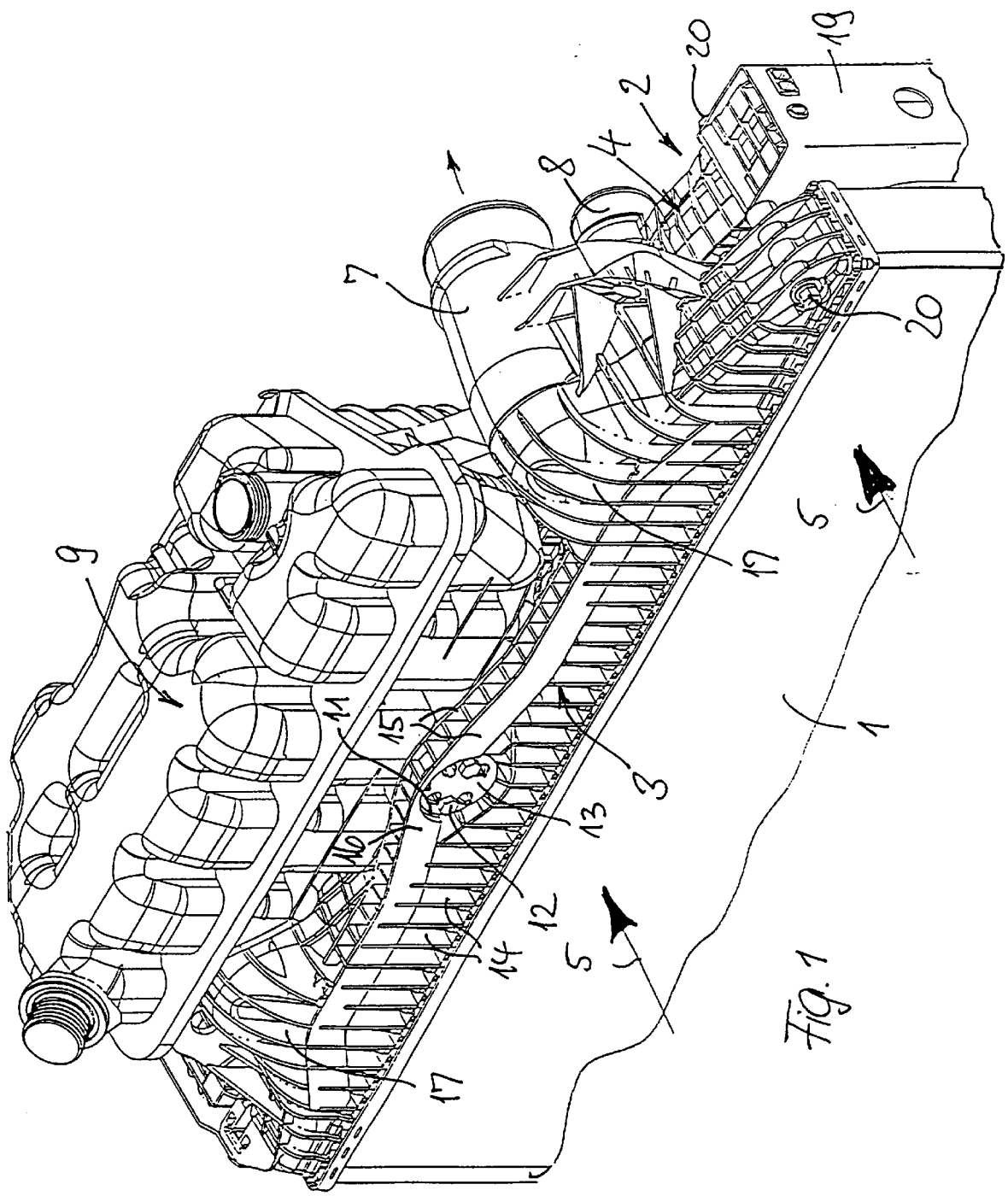
FIG. 1 is a perspective representation of the upper feed cases of a cooling module which has a coolant radiator and a charge air cooler connected in parallel with the coolant radiator.
Figure 2:
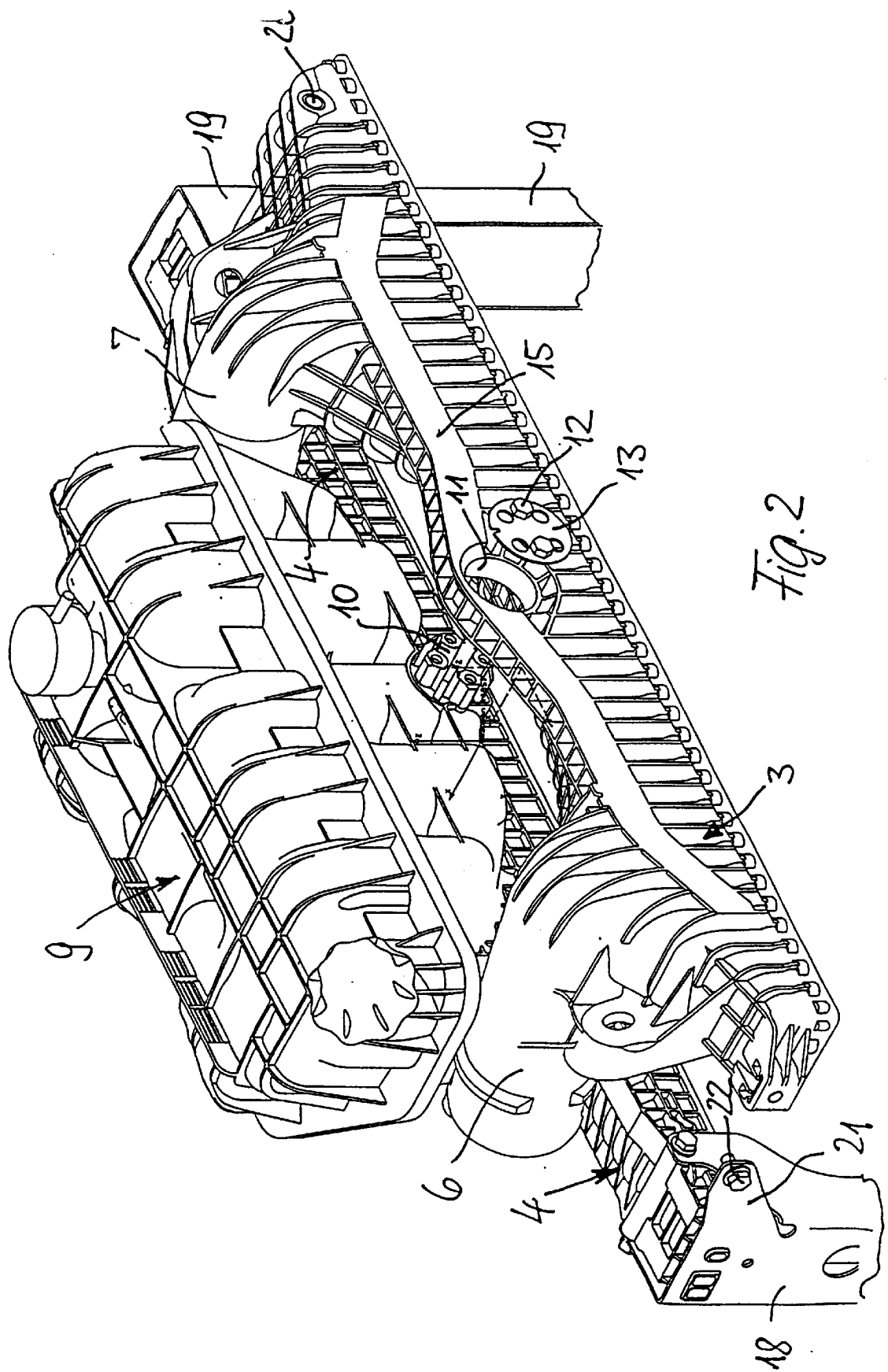
FIG. 2 is a schematic representation of the two coolant feed cases of the coolant radiator and the charge air cooler before their fastening to one another.

Each of FIGS. 1 to 6 shows the upper end of a charge air cooler 1 and of a coolant radiator 2 arranged parallel thereto. In a known manner which is not shown in detail, the charge air-cooler 1 and the coolant radiator 2 respectively include one fin/tube block having tubes which, in each case, lead into the illustrated upper feed cases 3 and 4 and into lower feed cases which are not. shown. Air flows in the direction of the arrows 5 through both the charge air cooler 1 and the coolant radiator 2. In a known manner, the cooling module, constructed of the two coolers 1 and 2, may be installed in a motor vehicle, and is particularly suitable for a utility vehicle. As illustrated in FIG. 2, the charge air cooler has a feed case 3, which may be made of cast metal or of a plastic material and which is provided with scoop-type tube connection pieces 6 and 7 which extend in the direction of the feed case 4 of the coolant radiator 2. The tube connection piece 6 is used for feeding the charge air to be cooled and the tube connection piece 7 is used for removing the cooled charge air which is only deflected in the lower collecting case of the finned-tube block of the charge air cooler.

The feed case 4 of the coolant radiator is also made of cast metal or of a plastic material. This feed case 4 also has a feed connection piece 8 for cooling and a removal connection piece which is not shown in detail and which may also be mounted on the feed case 4 or on the lower collecting case of the coolant radiator 2 which is not shown.

In this embodiment, the feed case 4 of the coolant radiator 2 is provided in one piece with an expansion tank 9 which is disposed on top of the coolant case 4 and projects beyond this case as well as beyond the feed case 3 of the charge air cooler 1 in the upward direction.

As is also illustrated in FIG. 2, the feed case 4 of the coolant radiator is provided with a connection piece 10 which projects toward the charge air cooler 1 and is molded on in one piece below the expansion tank 9. This connection piece 10 has a relatively large diameter and, as illustrated in FIG. 7, projects into an opening 11 arranged on the feed case 3 of the charge air cooler. On its front end, the connection piece 10 is provided with threaded bores into which fastening screws 12 which penetrate a disk 13 are inserted. This disk 13 rests on the outside on a step of the opening 11 and, together with the screws 12, is used as a fastening element for the connection piece on the feed case 3.

The feed case 3 is provided with fins 15 connecting the upper ends of reinforcing fins 14, which fins 15 form, approximately in the center of the feed case 3, a fastening bracket 16 containing the opening 11. The fastening bracket 16 is formed by a buckling of the fins 15 in the upward direction. Otherwise, the fins 15 lead to the outside and into the sturdily designed deflection elbow areas 17 of the feed and removal connection piece 6 and 7 for the charge air and thus form a stiff and stable further development of the feed case 3.

As a result of the arrangement of longitudinal and transverse fins, the feed case 2 for the coolant radiator also has a reinforced construction which, in the illustrated embodiment, is framed by side parts 18 and 19, each of which consists of a steel plate or other metal profile bent in a U-shape. The two feed cases 2 and 3 are connected on the outside, by way of the connection piece 10 arranged approximately in the center, in the two outer areas, specifically on the side of the side part 19 (see also FIG. 8) by a stud 20 which extends through correspondingly constructed openings and which also penetrates corresponding bores in the U-shaped side part 19.

While an arrangement involving fastening by way of the studs 20 and fastening by way of the connection piece 10 may be called a fixed-bearing arrangement, the connection between the feed cases 3 and 4 on the side facing away from the stud 20—see in particular FIG. 5—has an approximately triangular bracket 21 which projects from the U-shaped steel plate profile 18. The bracket 21 is fastened by way of a fastening screw 22 arranged perpendicularly to the axis of the stud 20 on the feed case 3 of the charge air cooler 1. As a result of this further development, a movable bearing is created at this point which, on this side, permits the feed case 3 to laterally expand with an elastic deformation of the bracket 21. Since, on this side of the feed case 3 of the charge air cooler, the hot charge air enters through the feed connection piece 6, thermal expansions are to be expected particularly in this area. These expansions may be absorbed by the arrangement of the bracket 21 without any disadvantageous influence on the mechanical. connection between the charge air cooler 1 and the coolant radiator 2.

During operation of the motor vehicle, considerable and asymmetrical forces may occur on the installed cooling module which is fastened by way of the side parts 19 in a manner known per se in the engine compartment of the vehicle. These forces are caused by the elevated expansion tank 9 arranged in one piece, in the event of accelerations or decelerations of the vehicle, or by the charge air which is intermittently and at a high pressure pressed or forced into the feed connection piece 6. The stable connection between the two feed cases 3 and 4 in the range of their end areas, and particularly in the center area, as a result of the form closure between the connection piece 10 and the bracket 16 produces a very stable overall holding for the charge air cooler 1 and the coolant radiator. This permits absorption of the forces asymmetrically acting upon the cooling module by the block formed by the charge air cooler feed case and the coolant feed case and conduction of these forces by way of these two coolers in a uniform manner to the suspension. Because of the resulting wider support basis, in the direction 5 of the air flowing through, it becomes possible in this manner to largely prevent deformations on one of the two feed cases. As in the prior art, such deformations possibly may result in damage to the tight connection between the finned-tube block and the feed case.

The embodiment described has a parallel arrangement of a radiator for the coolant of a motor vehicle engine and of a charge air cooler. Since it is not important, as far as the invention is concerned, for a coolant radiator and a charge air cooler to be connected with one another, the invention can also be used when, for example, a coolant radiator and the condenser of an air conditioner are to be connected in parallel. Also, in this case, the respective feed cases connected with the finned-tube blocks can be further developed according to the invention and connected to form a common block which can better absorb the asymmetrically introduced forces. The additional fastening or connection between the feed cases is selected such that it is situated as closely as possible to the point of introduction of the asymmetrical force.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Cooling module comprising:
   two heat exchangers, through which air flows, said heat exchangers including a coolant radiator and a charge air cooler which are connected directly behind one another in an air flow direction of the air, and which are connected with one another at outer ends of at least one pair of their feed cases for a medium to be cooled by air, and
   at least one additional fastening point provided approximately in the center of the said at least one pair of feed cases.

2. Cooling module comprising:
   two heat exchangers, through which air flows, said heat exchangers including a coolant radiator and a charge air cooler which are connected directly behind one another in an air flow direction of the air, and which are connected with one another at outer ends of at least one pair of their feed cases for a medium to be cooled by air, and
   at least one additional fastening point provided between the outer ends of the feed cases,
   wherein one of the feed cases which is a feed case of the coolant radiator, for forming the additional fastening point, is provided with a connection piece projecting to another adjacent feed case of the charge air cooler, and wherein said connection piece engages form-lockingly in an opening in the feed case of the charge air cooler.

3. Cooling module according to claim 2, and further comprising an additional part which has an expansion tank fitted onto said one of the feed cases.

4. Cooling module according to claim 3, wherein the expansion tank and the connection piece are molded in one piece to the deed case of the coolant radiator.

5. Cooling module according to claim 2, wherein the connection piece is provided with a relatively large cross-section and is provided on a face side thereof with threaded openings into which fastening screws engage which are held on the feed case of the charge air cooler.

6. Cooling module according to claim 5, wherein the opening in the feed case of the charge air cooler is arranged in a fastening bracket which is formed by continuous reinforcing fins and is provided with a stop edge for a disk, through which the fastening screws are guided.

7. Cooling module comprising:
   two heat exchangers, through which air flows, said heat exchangers including a coolant radiator and a charge air cooler which are connected directly behind one another in an air flow direction of the air, and which are connected with one another at outer ends of at least one pair of their feed cases for a medium to be cooled by air, and
   at least one additional fastening point provided between the outer ends of the feed cases,
   wherein the feed cases are mutually fastened by a stud which form-lockingly penetrates the feed cases at a first end of the feed cases, by a connection piece which is provided in a center area and form-lockingly engages in an opening of the adjacent feed case and, at a second end of the feed cases, by way of a bracket projecting from a side part.

8. Cooling module according to claim 7, wherein the bracket is fastened by a screw having an axis which extends perpendicularly to axes of the connection piece and the stud.

9. Cooling module according to claim 8, wherein the bracket projects from a U-shaped side part of the coolant radiator.

10. Cooling module according to claim 9, wherein the bracket is arranged on a side of the feed case of the charge air cooler which is assigned to an air inlet connection piece of the charge air cooler.

11. Cooling module according to claim 4, wherein the connection piece is provided with a relatively large cross-section and is provided on a face side thereof with threaded openings into which fastening screws engage which are held on the feed case of the charge air cooler.

12. Cooling module according to claim 11, wherein the opening in the feed case of the charge air cooler is arranged in a fastening bracket which is formed by continuous reinforcing fins and is provided with a stop edge for a disk, through which the fastening screws are guided.

* * * * *